Nov. 17, 1959 — H. F. WINDSOR — 2,913,352
SCREEN SETTLING FOR CATHODE RAY TUBES
Filed July 6, 1956

INVENTOR:
HAROLD F. WINDSOR,
BY *Nathan Kornfeld*
HIS ATTORNEY.

United States Patent Office 2,913,352
Patented Nov. 17, 1959

2,913,352

SCREEN SETTLING FOR CATHODE RAY TUBES

Harold F. Windsor, Syracuse, N.Y., assignor to General Electric Company, a corporation of New York Application July 6, 1956, Serial No. 596,197

7 Claims. (Cl. 117—33.5)

This invention relates to cathode ray tubes and more particularly to novel apparatus and methods for settling luminescent screens onto the viewing area of cathode ray tubes.

In the cathode ray tube art it has been found advantageous to employ tubes having a viewing area consisting of a luminescent screen disposed on a curved face panel. Face panels having a curved contour are more desirable for a number of reasons including the fact that curved face panels are generally stronger and more economical to produce. Heretofore, a method for applying a surface of luminescent material onto the face panels of such cathode ray tubes consisted of introducing a solution containing luminescent particles, commonly phosphor, in suspension therein and allowing the particles to settle onto the surface of the face panel to form a viewing area or screen.

In liquid settling of cathode ray tubes, if the liquid is perfectly stationary, the number of the luminescent particles that settle per unit area is related to the height of the liquid from which the particles settled. Consequently, if a luminescent screen is to be settled on a curved face panel having a concave contour, there is a gradient of luminescent material thickness from the middle to the extremities of the screen. As the luminescent screen thickness increases, the screen under electron excitation appears more yellow with a consequent decrease in screen brightness. In concave face panels the luminescent material thickness may become sufficiently pronounced in the center portions to be visually observed as a "yellow center" resulting in the tube having objectionable viewing quality.

The luminescent material distribution can be partly influenced by various methods such as by the application of heat, by the height of screening solution used, and by employing various methods of introducing the phosphor slurry into the screening solution, such as by spraying. However, none of the aforementioned methods satisfactorily eliminates the "yellow center."

Turbulences produced due to the earth's rotation, or to the vibration of the table or conveyor on which the cathode ray tube is supported, or to the influence of the spray itself may also at times cause the luminescent material to tend to settle in a visible circular or whirlpool type of pattern. Such a pattern also tends to interfere with the viewing qualities of the cathode ray tube.

Accordingly it is a principal object of the present invention to provide novel apparatus and methods for screening curved viewing areas of cathode ray tubes.

It is another object of the present invention to provide novel apparatus and method for obtaining luminescent screens of uniform thickness on a viewing area of curved contour.

In the attainment of the foregoing objects, I provide apparatus for settling luminescent material through a settling solution onto a curved viewing area of a cathode ray tube consisting of a rod member having a predeterminedly outstanding ledge portion and a curved end portion, which is inserted into the solution during the settling operation. The rod, the included ledge portion, and the curved end portion cause the luminescent material to be uniformly distributed over the surface of the viewing area.

Other objects and advantages will be apparent after a consideration of the specification and drawings in which.

Figure 1:
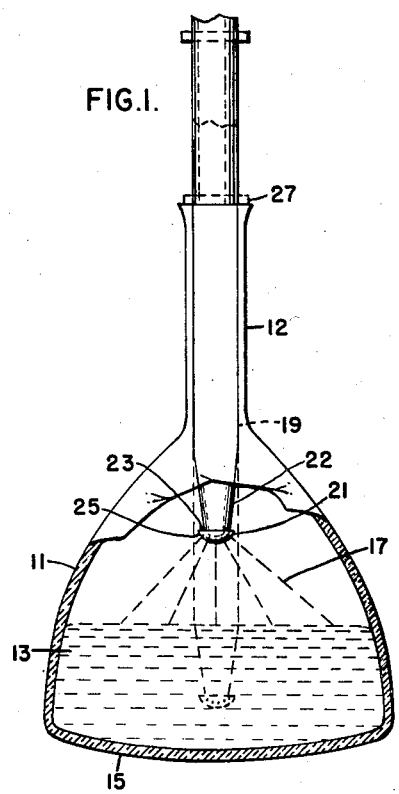
Figure 1 is an elevation view, partly in cross section, of a cathode ray tube showing the apparatus and method employed in the settling of a luminescent screen in accordance with the present invention.

Figure 1 shows a cathode ray tube envelope or bulb 11 into which there has been introduced a screening or cushion solution 13 which may consist of, for example, dilute barium acetate solution covering the curved face panel 15. When the solution 13 has become motionless, a hollow rod member 19 which may be of any suitable material not affected by the solution, having an outer contour in accordance with the invention, and having a vented end portion 25 sprays a phosphor slurry 17 which may consist of powdered phosphor, silicate solution, and water, to uniformly cover the surface of solution 13. The phosphor particles settle due to gravitational forces through solution 13 onto the surface of the face panel 15. The member 19 is lowered into the screening solution 13 immediately after the phosphor-silicate slurry 17 is sprayed into the dilute barium cushion. Member 19 may have affixed thereto a stop or locating member 27 which locates tip portion 21 at a predetermined depth in the liquid cushion 13. Satisfactory results are obtained when the stop 27 is affixed to rod 19 such that the rod is inserted to approximately ⅔ of the average depth of the solution 13. The rod member 19 has bulbous shaped tip portion 21 including a ledge portion 23 thereon and the convex curved end portion 25. Rod member 19 displaces a predetermined volume of solution 13 from over those portions of the curved face panel 15 which initially have a larger head of solution. The effect is to tend to equalize the height of the solution over the entire surface of the face panel so that a uniform number of particles settle throughout the face panel surface. The particles 17 immediately adjacent the rod member 19 tend to cling to the rod as they settle downward. The ledge portion 23 is required to intercept and retain the phosphor particles which tend to cling to the rod 21 surface as the particles settle downward. Without the ledge the particles settle as a heavy ring on the face panel 15, which results in a visible yellow ring undesirably affecting the viewing qualities of the tube 11. Member 19 may include a section 22 tapered to a diameter smaller than the regular diameter of the rod and the ledge portion 23 is formed to extend circumferentially and normal to the axis of the rod. Tapered section 22 is included so that the ledge portion may be formed having a diameter slightly smaller than the regular diameter of the rod member 19 in order to prevent damaging the ledge as it is moved through the neck 12 of the tube.

The center portion of the face panel 15 immediately below the rod 19 is coated by those phosphor particles settling through the volume of solution 13 between the bottom end 25 of the rod and the face panel 15 and also by those phosphor particles 17 in the solution adjacent the ledge 23 which particles tend to cling to the curved end or bottom portion 25 of the rod 19 in their settling path, producing a smooth gradient settling pattern which desirably eliminates any phosphor concentrations which would result in undesirable visible yellow spots. The convex contour of the end portion 25 for the particular embodiment corresponds approximately to the contour of the curved face panel 15.

Figure 2:
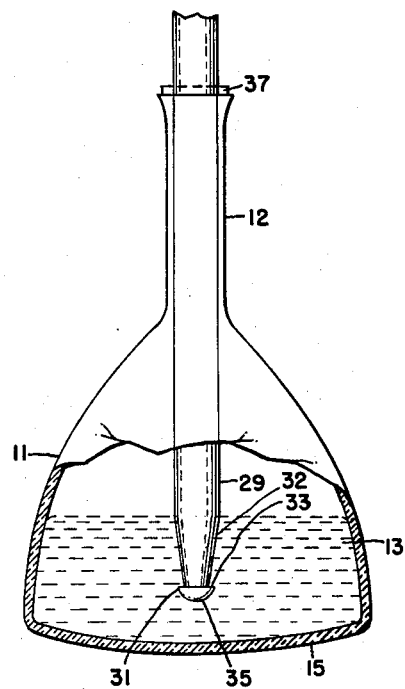
Figure 2 is an elevation view, partly in cross section, of a cathode ray tube showing an alternative apparatus and method employed in the settling of a luminescent screen in accordance with the present invention.

In some factory operations, it has been found convenient and more expeditious to initially pour a premixed solution 14 of barium silicate and phosphor into the bulb 11 instead of spraying the slurry into the solution, Figure 2. A solid rod member 29 having an outer shape similar to rod 19, and having an inverted bulbous shaped tip portion 25 including a tapered section 32, a ledge portion 23 and a convex curved end portion 35 is then inserted into solution 14 to a depth which may be determined by a stop 37. Rod 29 functions similarly to rod 19, to effect the settling of a uniform screen on face panel 15.

The rods 19 and 29 must be of appreciable diameter in order to eliminate the yellow center, for example in one practical embodiment a rod member having a diameter of 1⅛" is employed in a tube having a face panel approximately 8" in length.

Figure 3:
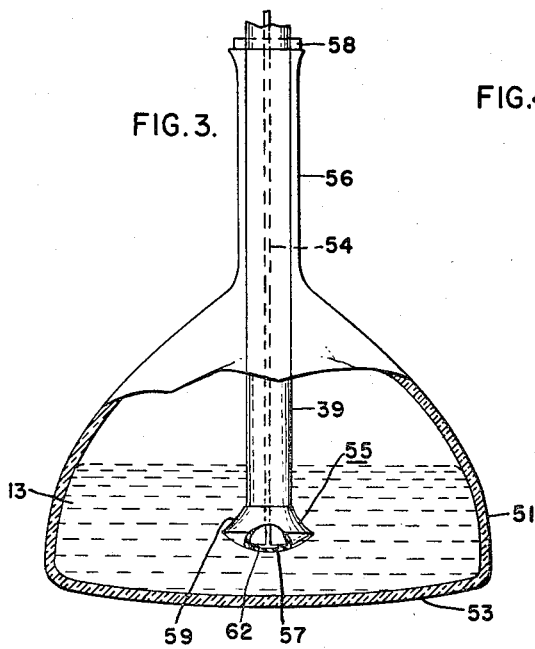
Figure 3 is an elevation view, partly in cross section, of a cathode ray tube showing another embodiment of the apparatus in accordance with the present invention.

Figure 3 shows an alternative embodiment of the present invention in which a rod member 39 having a cap-like or umbrella-shaped member 55 is employed in coating the face panel 53 of bulb 51. This embodiment is preferable for coating face panels of relative larger size. Rod 39 is hollow and has a flexible cap member 55 on one end thereof. A plunger 54 made of hard rubber or the like extends through rod 39. Plunger 54 has an extending end portion 62 which is attached as by vulcanizing or other suitable methods to the interior of cap 55. Member 55 is made of a suitable material such as rubber, plastic or other such material, and has a frusto-conical ledge portion 59 and a convexly formed end portion 57 which perform the same function as the ledges 23, 33 and end portions 25, 35 respectively, of Figures 1 and 2. The free end of the conical portion 59 is dimensioned to fit snugly over the outer surface of rod 39. Cap 55 is collapsed or contracted when it is inserted or removed through the neck 56 of bulb 51. After the cap 55 is through the neck 56 it may be extended by plunger 54 by pushing the plunger toward the capped end of the rod. A catch or lock, not shown, may be included on the plunger 54 to retain its extended position. The cap 55 is collapsed or contracted by pulling the plunger 54 toward the end of the rod opposite the cap.

Figures 4A, 4B:
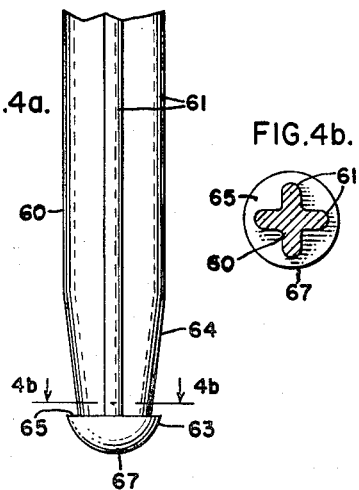
Figure 4a is an elevation view of another embodiment of the apparatus according to my invention.
Figure 4b is a cross section view of the structure of Figure 4a taken on the line 4b—4b thereof.

Figures 4a and 4b show an alternative embodiment of a rod member 60, according to my invention. The rod 60 is constructed to have cross like arm extensions 61 along the length of the rod which are particularly useful to prevent whirlpool type settling mentioned hereinabove. Rod 61 includes a section 64 tapered similarly and for the same purpose as is section 32 of rod 29. Tip portion 63 of rod 59 including ledge portion 65 and end portion 67 is similar to tip portion 31 of rod 29 in Figure 2 and affect the settling process in the same manner. The arm extensions 61 tend to interrupt the whirlpool flow and cause the phosphor particles to settle downward in uniform thickness.

Heating of the face panel of the tube during the settling process appears to produce convection currents in the solution which seem to influence the smaller slower-falling particles to cause them to drift towards the screen extremities which may aid in obtaining a luminescent screen having a more uniform thickness.

While specific examples have been given in describing details of this invention, it will be understood that they have been given merely by way of illustration and that the invention is not limited thereto.

What I claim as new and desire to secure by Letters Patent of the United States is:

1. In the processing of cathode ray tubes of the type having curved viewing areas, the method of forming luminescent screens on said viewing areas comprising the steps of introducing a solution containing luminescent particles in suspension over said viewing areas, displacing a portion of said solution from over those areas of said face panel which are furthest below the surface of said solution, and intercepting luminescent particles settling through a predetermined cross section of said solution.

2. In an apparatus for forming screens of luminescent particles on curved face panels of cathode ray tubes, said particles being settled through a settling solution introduced over said face panel, means for applying a screen of substantially uniform thickness on said face panel comprising a rod member having outward projections along the length thereof, a bulbous portion on an end of said rod member adapted to be immersed in the settling solution, a ledge formed on said bulbous portion adapted to intercept and collect particles settling downwardly through the settling solution adjacent said rod member.

3. In an apparatus for forming screens of luminescent particles on curved face panels of cathode ray tubes, said particles being settled through a settling solution introduced over said face panel, means for applying a screen of substantially uniform thickness on said face panel comprising a rod member having an annular body portion including a tapered section, a bulbous portion, the circumference of said bulbous portion being less than the diameter of said body portion, a ledge on said bulbous portion adapted to intercept and collect said particles settling through said solution.

4. In an apparatus for forming screens of luminescent particles on curved face panels of cathode ray tubes, said particles being settled through a settling solution introduced over said face panel, means for applying a screen of substantially uniform thickness on said face panel comprising a rod member having an annular body portion including a tapered section, a bulbous tip portion adjacent said tapered section, the circumference of said tip portion being less than the diameter of said body portion, a ledge on said bulbous portion adapted to intercept and collect said particles settling through said solution, said bulbous portion having a convex shaped end portion for aiding in settling said particles adjacent said tip portion in a uniform gradient.

5. In an apparatus for forming screens of luminescent particles on curved face panels of cathode ray tubes, said particles being settled through a settling solution introduced over said face panel, means for applying a screen of substantially uniform thickness on said face panel comprising an immersion member adapted to be inserted in settling solution to displace portions of said solution over certain predetermined areas of the face panel, and lateral projections on the immersion member forming upwardly facing surfaces adapted to intercept and collect said luminescent particles settling through a predetermined portion of said solution.

6. In an apparatus for forming screens of luminescent particles on curved face panels of cathode ray tubes, said particles being settled through a settling solution introduced over said face panel, means for applying a screen of substantially uniform thickness on said face panel comprising a rod member having an annular body portion including a tapered section, a bulbous tip portion adjacent said tapered section, said bulbous portion having a convex shaped vented end portion adapted to spray said luminescent particles on said solution, said rod adapted to be inserted into said solution, a ledge on said bulbous portion, said ledge and said convexed shaped end portion effecting a uniform distribution of luminescent particles on said face panel.

7. In the method of forming luminescent screens on curved face panels for cathode ray tubes including the steps of covering a curved face panel with a charge of liquid, introducing particles of luminescent material into the liquid, and allowing said particles to settle through the liquid onto the immersed face panel, the improvement which comprises inserting a liquid displacing member a portion of said liquid over those areas of said face panel which are furthest below the surface of said liquid to displace some of said liquid from over said areas during settling of the luminescent particles so as to reduce the variation in liquid depth over all portions of said face panel.

References Cited in the file of this patent

UNITED STATES PATENTS

| | | |
|---|---|---|
| 1,495,487 | Johnson | May 27, 1924 |
| 2,607,706 | Lowry et al. | Aug. 19, 1952 |
| 2,676,110 | Hesse | Apr. 20, 1954 |
| 2,678,888 | Evans | May 18, 1954 |